(12) United States Patent
Brueck et al.

(10) Patent No.: US 9,476,336 B2
(45) Date of Patent: Oct. 25, 2016

(54) CONTAINER HAVING A HEATING DEVICE FOR A TANK FOR STORING A LIQUID ADDITIVE AND MOTOR VEHICLE HAVING A TANK

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 13 days.

(21) Appl. No.: 14/552,750

(22) Filed: Nov. 25, 2014

(65) Prior Publication Data

US 2015/0075141 A1    Mar. 19, 2015

Related U.S. Application Data

(63) Continuation of application No. PCT/EP2013/060767, filed on May 24, 2013.

(30) Foreign Application Priority Data

May 25, 2012   (DE) .................. 10 2012 104 551
Aug. 7, 2012    (DE) .................. 10 2012 107 208

(51) Int. Cl.
F01N 3/20   (2006.01)
F24H 1/00   (2006.01)
F24H 1/20   (2006.01)

(52) U.S. Cl.
CPC ............. *F01N 3/2013* (2013.01); *F01N 3/208* (2013.01); *F01N 3/2066* (2013.01); *F24H 1/009* (2013.01); *F24H 1/201* (2013.01);
(Continued)

(58) Field of Classification Search
CPC .... F01N 3/2066; F01N 3/2013; F01N 3/208; F01N 2610/02; F01N 2610/10; F01N 2610/1406; F01N 2610/1433; F01N 2610/1486; F24H 1/009; F24H 1/201; Y02T 10/24
USPC ................... 60/295, 303, 320; 392/441
See application file for complete search history.

(56) References Cited

U.S. PATENT DOCUMENTS 6,253,743 B1   7/2001   Hyodo et al.
7,849,674 B2   12/2010  Masuda et al.
(Continued)

FOREIGN PATENT DOCUMENTS

DE   102008000549 A1   11/2008
DE   102008005196 A1   7/2009
(Continued)

*Primary Examiner* — Audrey K Bradley
(74) *Attorney, Agent, or Firm* — Laurence A. Greenberg; Werner H. Stemer; Ralph E. Locher (57) ABSTRACT

A container for a tank for storing a liquid additive includes a housing having a heater and at least one drivable apparatus for promoting convection in the housing. A motor vehicle includes a tank for storing a liquid additive and an exhaust gas system having a metering or adding device for the liquid additive. A container is inserted into the tank wall and a plurality of functional components is provided in the container for conveying the liquid additive from the tank through the container to the metering or adding device.

12 Claims, 4 Drawing Sheets

(52) U.S. Cl.
CPC ...... *F01N 2610/02* (2013.01); *F01N 2610/10* (2013.01); *F01N 2610/1406* (2013.01); *F01N 2610/1433* (2013.01); *F01N 2610/1486* (2013.01); *Y02T 10/24* (2013.01)

(56) References Cited

U.S. PATENT DOCUMENTS

| | | | |
|---|---|---|---|
| 8,301,020 B2 | 10/2012 | Wildegger | |
| 2006/0131297 A1* | 6/2006 | Kim | ..................... F24C 15/325 219/394 |
| 2010/0266458 A1 | 10/2010 | Takeshita et al. | |
| 2012/0125909 A1 | 5/2012 | Scheunert et al. | |
| 2012/0325837 A1* | 12/2012 | Amagasaki | ........... F01N 3/2066 220/745 |
| 2013/0219869 A1 | 8/2013 | Brueck et al. | |

FOREIGN PATENT DOCUMENTS

| | | | | |
|---|---|---|---|---|
| DE | 102010024022 A1 | 12/2011 | | |
| EP | 0982490 A2 | 3/2000 | | |
| EP | 1669567 A1 | 6/2006 | | |
| EP | 2226478 A1 | 9/2010 | | |
| EP | 2255692 A1 | 12/2010 | | |
| JP | 08057261 A | 3/1996 | | |
| JP | 2002166130 A | 6/2002 | | |
| WO | WO 2010136205 A1 * | 12/2010 | ............. A45D 20/12 |
| WO | WO 2011105426 A1 * | 9/2011 | ........... F01N 3/2066 |

* cited by examiner

CONTAINER HAVING A HEATING DEVICE FOR A TANK FOR STORING A LIQUID ADDITIVE AND MOTOR VEHICLE HAVING A TANK

CROSS-REFERENCE TO RELATED APPLICATION

This is a continuation, under 35 U.S.C. §120, of copending International Application No. PCT/EP2013/060767, filed May 24, 2013, which designated the United States; this application also claims the priority, under 35 U.S.C. §119, of German Patent Application DE 10 2012 104 551.8, filed May 25, 2012 and German Patent Application DE 10 2012 107 208.6, filed Aug. 7, 2012; the prior applications are herewith incorporated by reference in their entirety.

BACKGROUND OF THE INVENTION

Field of the Invention

The present invention relates to a container for a tank for storing a liquid additive, in which the container includes a housing with a heating device. Such a container serves, in particular, for accommodating functional components for the delivery and/or dosing and/or monitoring of the liquid additive on its way from the tank through the container to a consumer. The invention also relates, in particular, to a motor vehicle which is provided with a tank for storing a liquid additive and a container integrated in the tank in the motor vehicle.

The use of exhaust-gas after treatment methods in which liquid additive is added to the exhaust gas is considered to be known. The aim of such methods is, in particular, for the pollutants contained in the exhaust gas to be converted in as complete and efficient a manner as possible.

For example, it is known for an oxidant (for example fuel or hydrocarbons) to be supplied to the exhaust gas. The additive may be used to directly react with constituents in the exhaust gas and thus convert pollutants. It is, however, also possible for the oxidant to be used to alter ambient conditions in the exhaust system to a desired state suitable for the conversion of pollutants. Fuel or hydrocarbons may, for example, be supplied to an oxidation catalytic converter, wherein the temperature of the exhaust gas in the exhaust system can be increased considerably due to an exothermic reaction in the oxidation catalytic converter. That is used, in particular, for the regeneration of a diesel particle filter.

Furthermore, it is known for a reducing agent to be supplied to the exhaust gas. Even though it is basically possible for solid or gaseous reducing agents to be introduced into the exhaust system, delivery systems and dosing systems which provide a supply of the reducing agent in liquid form have proven to be particularly suitable. For example, the method of selective catalytic reduction (SCR) is known. In that case, the nitrogen oxide compounds in the exhaust gas are converted with the aid of the reducing agent. For that purpose, ammonia or substances that form ammonia may be used, in particular. An already widely used reducing agent for that purpose is urea-water solution. A 32.5% urea-water solution is known under the trademark AdBlue®. The liquid additive is then initially admixed to the exhaust gas and subsequently conducted across a suitable catalytic converter in which (inter alia) the desired chemical conversion then takes place.

Specifically with regard to series production in the field of automotive engineering, a particularly inexpensive and simple construction of a delivery module or dosing module for the additives has in that case not yet been found. For space reasons and in order to prevent damage in the event of freezing, it has already been proposed that a dosing module of that type be disposed, for example, in the base region of a tank for storing the liquid additive. In order, even in that case, to facilitate the retrofitting of already known systems or to permit separate manufacturing steps, delivery modules or dosing modules of that type are accommodated in a separate container or vessel. The container may be permanently or detachably connected to the tank.

Since it is, for example, the case that the liquid additive such as urea-water solution freezes at temperatures of around −11° C., heating systems have been proposed which are intended to effect a rapid thawing of the liquid additive in the tank and/or in a connected delivery line. The intention thereof is to already make the desired exhaust-gas purification method available a short time after the engine of a motor vehicle is started, and/or to prevent damage to the components required for the storage, delivery and/or metering of the liquid additive.

In that technical field, liquid-type heaters (for example heat exchangers that interact with the engine cooling system), electric heaters, radiation heaters and combinations thereof have already been proposed as heating devices. It has, however, not yet been possible to satisfactorily achieve the most rapid possible heating, and if appropriate also the most uniform possible heating, in the container. In particular, the proposed systems for heating the container are technically cumbersome, expensive and/or difficult to regulate or control.

SUMMARY OF THE INVENTION

It is accordingly an object of the invention to provide a container having a heating device for a tank for storing a liquid additive and a motor vehicle having a tank, which overcome the hereinafore-mentioned disadvantages and at least partially solve the highlighted problems of the heretofore-known containers and vehicles of this general type. In particular, it is sought to specify a container for a tank for storing a liquid additive, in which the container permits inexpensive, simple and efficient heating. Furthermore, it is sought to propose a particularly advantageous and space-saving integration of a heating system into a motor vehicle.

With the foregoing and other objects in view there is provided, in accordance with the invention, a container for a tank for storing a liquid additive, comprising a housing with a heating device and at least one drivable apparatus for promoting convection in the housing.

The container is, in particular, constructed so as to be accommodated at least partially and preferably virtually entirely in a tank for storing the liquid additive. In this case, the tank volume should be reduced, for example, by at most 20%, preferably at most 10%, as a result of the integration of the container into the tank. The tank is, in particular, a tank for storing a reducing agent, in particular urea-water solution. The tank could nevertheless also be used for oxidants and other liquid additives. The container may be formed from plastic. In any case, the tank should be durable and constructed for storing the liquid additive on a sustained basis. In this case, the housing may have a single-part or multi-part form. It is, for example, possible for a pot-shaped housing and an additional container base to be provided which are detachably or non-detachably connected to one another. The housing may be formed with plastic and/or metal. In any case, in that region of the housing which is in contact with the interior of the tank, the housing should be resistant to the liquid additive.

The container furthermore includes at least one heating device which is disposed, in particular, in the housing or in the container chamber formed by the housing. The heating device may basically be any of the types of heating devices mentioned in the introduction. It is preferable in this case for the heating device itself to take up only a small fraction of the container chamber, for example less than 20% of the container chamber or even less than 10% of the container chamber.

Furthermore, a drivable apparatus for promoting convection in the housing is provided. The drivable apparatus has the function, in particular, of distributing the heat, which is generated by the heating device, in the housing through the use of convection. It is preferable in this case for the drivable apparatus itself not to be in direct contact with the heating device, and instead for the heat released by the heating device to be distributed as uniformly as possible by convection through manipulation of the air flow in the interior of the container. In this case, convection is to be understood, in particular, to mean (the targeted) movement of air in the container. Air is therefore moved toward the heating device by using the drivable apparatus in such a way that the air can be heated when it comes into contact with the heating device. The heated air then flows, likewise under the action of the drivable apparatus and/or flow-guiding elements, into other (predefined) regions of the container cavity. In so doing, the heated air comes into contact with the housing and/or with components positioned in the housing, in such a way that rapid heating can be realized in this case.

In order to ensure that this can take place in an effective manner, the apparatus can be activated and deactivated according to demand. In this respect, the apparatus is constructed and/or set up so as to be driven (and moved) at predefined or desired times. The phases in which convection is promoted in the housing can thus be precisely predefined.

Through the use of a device of this type, the problems mentioned in the introduction can be at least partially alleviated. At the same time, it is possible to achieve rapid heating of the container and/or of the surroundings of the container in the tank.

The apparatus of the container may (additionally) be used for effective cooling of at least one component in the container. A component that may require cooling is, for example, a pump for the delivery and/or dosing of liquid additive. During operation, a pump of this type can heat up to a considerable degree. The heat can be transported away from the pump by using the apparatus and dissipated, for example, through the housing into the liquid additive in a tank.

In a preferred embodiment of the container, there is at least one closed flow path in the housing, along which flow path the apparatus can generate an, in particular, circulating air flow. The circulating air flow is the convection promoted by the apparatus. The flow path is formed by cavities within the housing and possibly by corresponding flow-guiding elements. Cavities are regions in the housing in which no components or functional components are disposed. The cavities thus provide space for the flow path. The flow path preferably runs along the heating device and along the regions to be heated (in particular the functional components) in the container and/or in the housing.

The flow path preferably runs along a wall of the housing. It is thus possible for the air flow to release heat to the liquid additive in the tank through the wall of the housing. The housing may be constructed and/or used, at least in sections, as a flow-guiding element. The wall of the housing preferably has a cylindrical form at least in sections, and the flow is diverted continuously onto a path along the wall by the curvature of the cylindrical form of the wall. In one embodiment, there are two closed flow paths in the housing, which flow paths each run along a section of the housing wall. On the housing wall, there is provided at least one first diverting point at which the flow paths are diverted away from the housing wall into an interior region of the housing. In the interior region of the housing, an exchange of heat takes place between the air stream and the functional components. There is at least one second diverting point at which the flow paths are diverted toward the wall of the housing again. The first diverting point and the second diverting point are respectively formed by a first diverting device or diverter and by a second diverting device or diverter. The diverting devices divert the flow at the diverting points. The diverting devices are flow-guiding devices. In the region along the housing wall and/or in the interior region of the housing, the flow paths run at least along an apparatus which is constructed to drive an air flow along the flow paths or promote convection along the flow paths. Furthermore, in the region along the housing wall and/or in the interior region of the housing, the flow paths run along the heating device, in such a way that an exchange of heat can take place between an air flow along the flow paths and the heating device or heater.

In accordance with a further preferred feature of the container of the invention, the device has a housing which has a double-walled form (with two walls) at least in sections. In this case, there is preferably an outer wall, which separates the housing or the container from the tank in fluid-tight fashion, and an inner wall, which at least regionally runs parallel to the outer wall. A gap-like intermediate space is preferably provided between the outer wall and the inner wall, through which intermediate space an air stream can flow. The outer wall and the inner wall are preferably spaced apart from one another by at least one spacer element or spacer. The spacer elements may also assist in a transfer of heat between the inner wall and the outer wall and the air flow. The spacer elements may, in particular, act as impingement elements on which the air flow in the intermediate space impinges and which is therefore in particularly good heat-exchanging contact with the air flow. The apparatus is preferably disposed so as to force the air flow generated by the apparatus into the intermediate space through at least one inflow opening in the inner wall. A flow path preferably runs from the apparatus into the intermediate space through the at least one inflow opening and subsequently from the intermediate space back into an interior of the housing through at least one outflow opening. The interior is delimited by the inner wall of the housing. A heating device may be disposed, for example, between the apparatus and the inflow opening of the inner wall of the housing, in such a way that the air that is delivered by the apparatus passes, after having been heated by the heating device, into the intermediate space and heats liquid additive in the tank surrounding the housing.

It is thus possible for multiple heating devices and apparatuses for promoting convection to be disposed in a described container, wherein these can each form partial or independent flows along different flow paths. The different flow paths may each be constructed to targetedly conduct a flow to particular regions and/or functional components within the container or the housing in order to heat the regions and/or functional components particularly quickly.

The flow speed of the air along the flow paths may be set through suitable construction of the cavity available for the flow paths within the housing. The larger the available free cross section, the lower the flow speed. The functional components and flow paths are preferably disposed in the housing in such a way that the heat energy generated by the heating device is released (practically) completely to the air flow, and the air flow in turn releases the heat energy (practically) completely to the functional components and the housing.

A container is particularly preferred wherein the housing has an inner wall and an outer wall which form an intermediate space in which there is formed at least one partially closed flow path for a convection flow.

Through the use of such a construction of flow paths within the housing, a particularly effective transfer of the heat originating from the heating device to the functional components and to the liquid additive in the tank is possible.

In accordance with another feature of the container of the invention, the at least one drivable apparatus includes a blower and a blower motor connected thereto.

In this embodiment, the drivable apparatus can be provided in particularly inexpensive and technically simple form. It is, for example, possible for the blower motor to be activated, and (later) deactivated again, at the desired times by using a control unit. The blower may, for example, include a type of rotor through the use of which the air in the container is set in motion. In particular, the blower may be oriented in such a way that the moving air originating therefrom is moved toward the heating device. It is basically possible for multiple blowers with a blower motor or with a respective blower motor to be provided. With regard to a reduction of costs, however, the use of a single blower with a single blower motor is preferable. It is very particularly preferable for the container to have only a single drivable apparatus.

In accordance with a further preferable feature of the container of the invention, the heating device has a single electrically operable heating element in the housing. An electrically operable heating element can likewise be activated and deactivated at predefined points in time. Such heating is realized, for example, on the basis of ohmic resistance heating. A known electrically operable heating element which should particularly preferably be used in this case is a so-called PTC (positive temperature coefficient) heating element. The construction of such PTC heating elements is already well known, so that further information with regard to them is readily available to a person skilled in the art.

In accordance with an added advantageous feature of the container of the invention, the heating device projects at least partially with a fully exposed periphery into the housing. The heating device may thus, for example, be in the form of an at least partially free-standing flange, an at least partially free-standing pillar or the like. It is clear that a heating element of this type is connected at least to the container base and/or to the housing in order to realize secure positioning of the heating device even under high dynamic loading (for example during driving operation in a motor vehicle). Electrical lines, control lines and the like are likewise realized through the contact. The heating element constructed to project at least partially with a fully exposed periphery into the housing, however, makes it possible for the air that is moved by the drivable apparatus to the heating device to impinge on the heating element over a large area, and/or to even flow around the heating element. Intensive contact between the air situated in the container and the heating device is made possible in this way, in such a way that the air can rapidly absorb and subsequently distribute heat. It is preferable for at least 50% of the circumferential surface of the heating device to be free from fixtures, so as to permit direct contact with the ambient air in the container chamber. The fraction may preferably also be at least 60% or even at least 80%.

In accordance with an additional feature of the container of the invention, a plurality of functional components are additionally provided in the container for delivering the liquid additive out of the tank and through the container. In this case, the container serves, in particular, for accommodating a delivery module and/or dosing module for the liquid additive. In this case, the delivery module or dosing module may extract liquid additive from the tank, and conduct the liquid additive out of the tank through the container, at predefined times and/or in predefined quantities. Examples of such functional components are the following: a delivery line, a feed line (for example a subsection of the delivery line through which the liquid additive is delivered from the tank to a pump), a discharge line (for example a part of the delivery line by which the liquid additive is conducted out of the container by a pump), a return line (for example a part of the delivery line by which liquid additive situated in the container is conducted back into the tank), a pump, a filter, a sensor, a control unit and the like. In particular, the container is constructed and set up in such a way that the drivable apparatus generates an air flow which initially runs past the heating device and which subsequently impinges on at least a multiplicity of the functional components in the container, so that the functional components can at least partially absorb the heat entrained by the air stream. The functional components are consequently heated by convection in the housing.

In accordance with yet another particularly preferable feature of the container of the invention, the housing is composed at least partially of plastic. The use of a plastics housing has the advantage that the production costs can be reduced, and weight can be saved. In the case of the container proposed herein, it should also be taken into consideration that the distribution of heat within the container due to convection means that it is no longer imperatively necessary for numerous heat bridges for heat conduction to be formed within the container.

In accordance with yet a further advantageous feature of the container of the invention, the housing has at least one internal fin. If appropriate, multiple fins may also be provided. The fin is, in particular, in the form of a (passive) heating fin and thus serves, in particular, for realizing intensive contact with the heated air. The fin may be constructed for absorbing heat by convection and if appropriate also conducting the heat into other regions of the housing. The fin is constructed to project from the housing inner wall, that is to say, in particular, into the cavity of the container. The fin could also be referred to as a vane, web, projection or the like, wherein the surface area is several times greater than the cross section. The orientation, form and/or material of the fin may be adapted in accordance with the application.

It is particularly advantageous for the fins to be oriented correspondingly to the flow direction of the air in the housing. The fins should, in particular, run parallel to the flow direction, in such a way that, firstly, particularly good heat transfer between the fins and the air is achieved, and secondly, the flow resistance generated by the fins is as low as possible. The fins should, in particular, be oriented parallel to the flow direction of the air or of the convection. This may be realized, for example, by using fins on the housing which extend, at least in sections, in circular form along the inner side of the (cylindrical) housing. If the air (driven by the apparatus) circulates on a flow path which runs, at least in sections, along the inner side of the housing, particularly good heat transfer is possible between the air and the fins on the inner side of the housing. At the same time, circular fins of this type can form sections of a flow path for the air through the housing. The flow is guided along the wall of the housing by the fins.

The fins increase the (inner) surface area of the housing and thus facilitate the transportation of heat from the inside to the outside. The fins may be manufactured from a material with particularly good thermal conductivity. In particular, it is possible for the fins to be manufactured from a different material than the rest of the housing. Furthermore, it is possible for the fins to extend through the housing to an outer side of the housing and into a tank for the liquid additive, wherein the fins exhibit increased thermal conductivity. Such fins can transmit heat into the liquid additive in the tank in a particularly effective manner.

With the objects of the invention in view, there is concomitantly provided a motor vehicle, comprising a tank for storing a liquid additive. The tank has a tank wall which forms or delimits a tank volume. The motor vehicle has an exhaust system with a metering device for the liquid additive. A container according to the invention is inserted into the tank wall and, in the container, there is provided a multiplicity of functional components for delivering the liquid additive from the tank through the container to the metering device. The motor vehicle is thus set up, in particular, for carrying out the method for exhaust-gas aftertreatment as mentioned in the introduction. Particular emphasis must be given in this case to the system proposed herein, with an inexpensive and efficient heater for the container, the functional components and/or the tank.

The invention and the technical field will be explained in more detail below on the basis of the figures. It should be noted that the embodiment variants illustrated in the figures are not intended to restrict the invention. In particular, the features presented and explained jointly in the figures may also be considered separately from one another and/or combined with other (individual) features of other figures as long as this is technically possible, or as long as the text below does not explicitly specify that features imperatively belong together. Accordingly, there emerges to a person skilled in the art a multiplicity of possible combinations of the invention illustrated diagrammatically and by way of example in the figures.

Other features which are considered as characteristic for the invention are set forth in the appended claims, noting that the features specified individually in the claims may be combined with one another in any desired technologically expedient manner. The description, in particular in conjunction with the figures, explains the invention and specifies further combinations of features and advantageous embodiments of the invention.

Although the invention is illustrated and described herein as embodied in a container having a heating device for a tank for storing a liquid additive and a motor vehicle having a tank, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
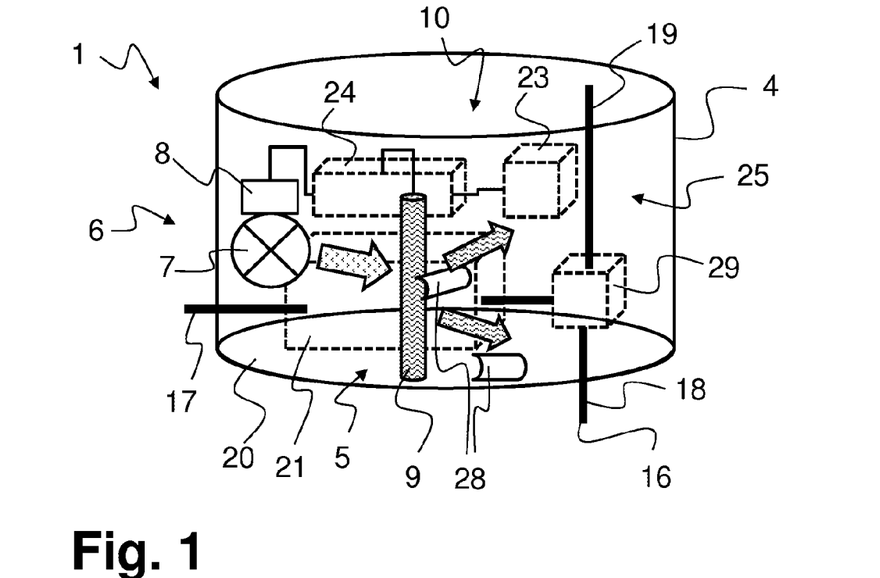
FIG. 1 is a diagrammatic, perspective view of a container.

Referring now to the figures of the drawings in detail and first, particularly, to FIG. 1 thereof, there is seen a container 1 which can be inserted, for example, into a tank for storing a reducing agent, such as a urea-water solution. In this case, the container 1 includes a pot-like housing 4 which has a circular cross section and which forms a circumferential surface and a cover. At the bottom, the container 1 is closed off by a container base 20. The container base 20 may, for example, be formed as a separate component which is detachably or non-detachably connected to the rest of the (pot-shaped) housing 4. In the interior of the container 1, a so-called container chamber is partially filled by various functional components 10 for delivering the liquid additive out of the tank through the container 1. In this case, the functional components 10 are illustrated by dashed lines in order to indicate that they may optionally be disposed individually or in any meaningful combination with one another in a container cavity 25.

In this case, by way of example, a delivery module or dosing module is indicated in the container chamber. The liquid additive is thus extracted from the tank through a feed line 17. This may be realized by way of a corresponding suction action of a pump 21 connected thereto. A delivery line 16 continues from the pump to a valve 29. Through the use of the valve 29, it is possible to predetermine, in accordance with demand, whether the now pressurized liquid additive is delivered onward to a discharge line 18, for example to an exhaust system, and/or to a return line 19 through which the liquid additive can be introduced back into the tank. A control unit or controller 24 may be provided for the controlled operation of the delivery module or dosing module. The control unit or controller 24 regulates the operation of the pump, of the valve and/or of further functional components through signal lines indicated in the figure. The control unit 24 may also perform the operation in a manner dependent on one or more sensors 23. A pressure sensor for the pressure of the liquid additive in the delivery line 16 and/or a temperature sensor for determining the temperature of the liquid additive in the delivery line 16 and/or for determining the temperature of a functional component or in the container cavity 25 may be used, for example, as the sensor 23.

A single heating device or heater 5 which, in this case, is constructed in the form of an electrically operable heating element or heater 9 (for example a PTC heating element), is also illustrated in the center of the figure. In this embodiment, the electrically operable heating element 9 may likewise be activated and deactivated in accordance with demand by the control unit 24. It can be clearly seen that the electrically operable heating element 9 predominantly projects with a fully exposed periphery into the housing 4, in such a way that in this case, an air flow (indicated by arrows) can be brought into intensive contact with the electrically operable heating element 9.

In order to achieve convection and thus a distribution of the air situated in the housing 4, a drivable apparatus 6 which, in this case, is implemented for example as a blower 7 and an associated blower motor 8, is also provided. In this case, too, it is possible for the control unit 24 to drive or stop the blower 7 by way of the blower motor 8 in accordance with demand and/or at predefined times.

The function is, in particular, provided in such a way that, during the operation of the apparatus 6, the air situated in the container cavity 25 is moved toward the heating element 9, as indicated by a vertically patterned arrow. When the air flow comes into contact with the heating device 5, the air is heated and can then be conducted to remote regions of the housing 4 and/or to one or more functional components 10. For this purpose, flow-guiding elements 28 (guide plates or the like) may be provided in/on the heating device 5 and/or in the container cavity 25 in order to realize a directed distribution or promotion of convection in the container 1. The air stream generated by the drivable apparatus 6 may be divided in any desired manner and conducted onward in various directions. The heated air flow is likewise indicated by arrows, which have a horizontal pattern.

Figure 2:
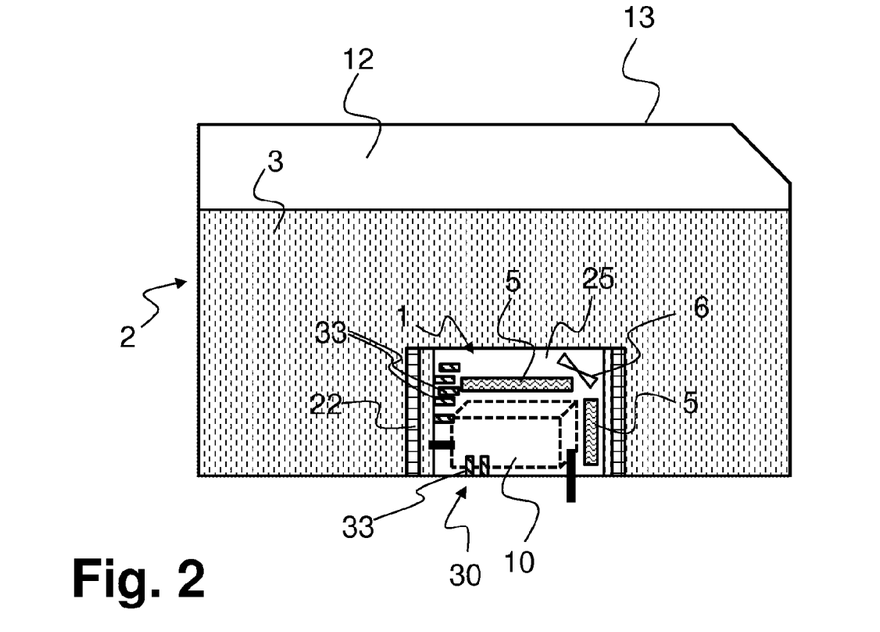
FIG. 2 is a vertical-sectional view of a tank with a container.

FIG. 2 diagrammatically shows a tank 2 for storing a liquid additive 3. The tank 2 is formed by a tank wall 13 which is, for example, manufactured from plastic. The tank wall 13 delimits a so-called tank volume 12. The tank wall 13 also has an opening 30, in this case in the region of the base, where the container 1 is inserted and connected in fluid-tight fashion to the tank wall 13. A majority of the housing 4 of the container 1 thus extends into the tank volume 12 of the tank 2. A (cylindrical) filter 22 is provided around the container 1. The functional components 10 extract the additive 3 in a region of the tank 2 in which (practically only) filtered additive 3 is present. The filter 22 may basically also be integrated into the container or into the delivery line situated therein.

It can also be seen from FIG. 2 that multiple heating devices 5 may be disposed in the container 1. The heating devices are in this case positioned, for example, areally in the manner of strips on the inner side of the housing and/or on a functional component. It is also shown therein by way of example that a single drivable apparatus 6 is disposed in the container and constructed so as to generate an air flow across multiple heating devices 5.

Multiple fins 33 in the form of a (passive) heating fin, which serves for making intensive contact with the heated air, are also diagrammatically indicated in FIG. 2. The fins 33 are, for example, disposed in a distributed manner on the inner side of the housing 4, in particular so as to be concentrated at the location toward which the heated air transported by the blower 7 is directed.

Figure 3:
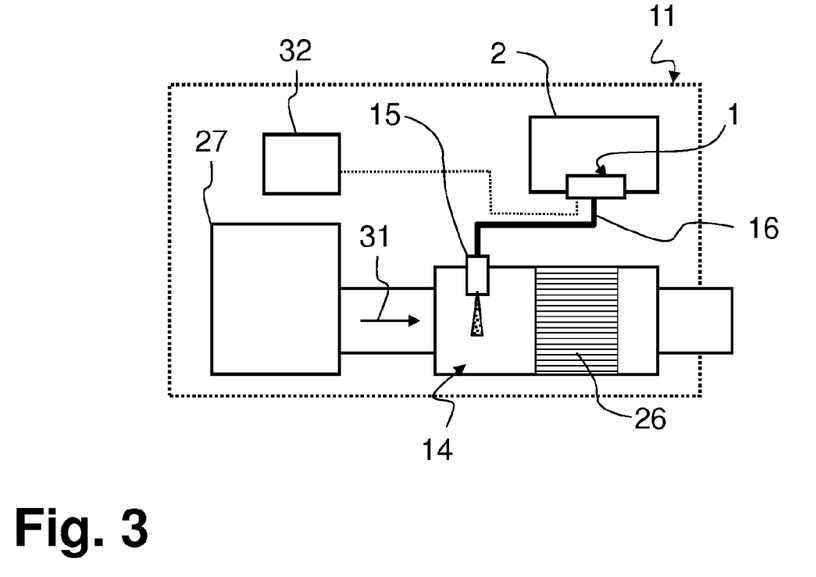
FIG. 3 is a block diagram of a motor vehicle with a tank and an exhaust system.

FIG. 3 shows a motor vehicle 11, for example a passenger motor vehicle or a truck, in which exhaust gas produced by an internal combustion engine 27, in particular a diesel engine, is conducted along an exhaust gas flow direction 31 through an exhaust system 14. In particular, in order to implement the so-called SCR method, the liquid additive is metered into the exhaust gas (in finely distributed fashion or with a delivery gas). When the additive has been adequately distributed in the exhaust gas and/or an adequate conversion of urea-water solution into ammonia has been realized, the mixture is supplied to a suitable exhaust-gas aftertreatment unit (such as an SCR catalytic converter) 26. The exhaust-gas aftertreatment unit may, for example, be in the form of a coated honeycomb body. The honeycomb body may, in particular, be provided with a suitable coating. When the additive-exhaust gas mixture flows through the catalytic converter 26, the desired chemical and/or thermal processes can be motivated.

In this case, the liquid additive is stored in a tank 2 and is metered in dosed fashion to a metering device or adder 15 by using the functional component(s) provided in the container 1 and through a suitable delivery line 16. The metered quantity and/or the time of the metering can be predefined by a controller 32. In this case, in particular, operating parameters of the internal combustion engine 27, of the exhaust system 14 and/or of the delivery system (tank, container, delivery line, metering device, etc.) should be considered for control by the controller 32. The dosing may be performed by using the functional components of the container 1 and/or the metering device 15.

Figure 4:
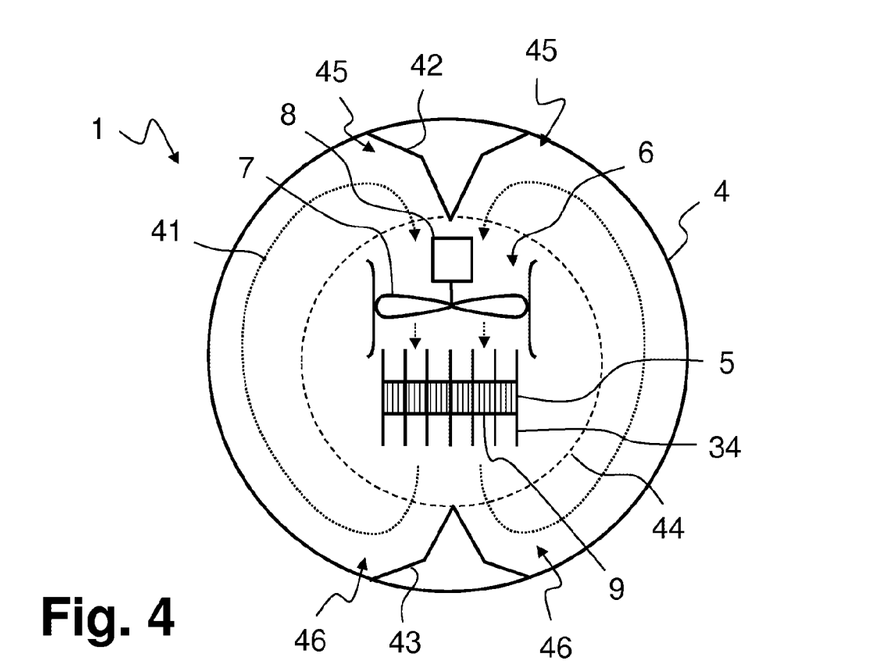
FIG. 4 is a cross-sectional view of an embodiment of a housing for a container.

FIG. 4 shows a horizontal section through a housing 4 for a container 1. The figure diagrammatically illustrates the apparatus 6 in the housing 4. The convection in the housing 4 can be promoted through the use of the apparatus 6. With regard to the convection, the operation of the apparatus 6 causes air flows to be generated in the housing 4, which air flows circulate along closed flow paths 41. The flow paths 41 run, at least in sections, along a wall of the housing 4. The air flow is thus in direct heat-exchanging contact with the housing 4. A first diverting device or diverter 42 which is disposed in the housing 4 diverts the flow paths 41 away from the housing 4 into an interior 44 of the housing 4 (first diverting point 45). Functional components that are not illustrated therein may also be disposed in the interior. The flow paths 41 run from the first diverting device 42 through the interior 44 and are subsequently diverted by a second diverting device or diverter 43 back to the housing 4 (second diverting point 46), in such a way that the flow paths 41 form closed paths. In the region of the interior 44, the flow paths 41 run past the apparatus 6 which promotes or drives the convection or the air flow. The apparatus 6 includes a blower 7 and a blower motor 8 that drives the blower 7. Furthermore, in the interior 44, the flow paths 41 run along a heating device or heater 5. The heating device 5 may include an electrically heatable heating element or heater 9 and additional heating fins 34 through which the heat of the heating element 9 is released. The heating device 5 is preferably constructed in such a way that there is good heat transfer to the air flow and, at the same time, there is the least possible flow resistance as the flow passes around the heating device 5. The apparatus 6 preferably forces the air flow directly toward the heating device 5 without any diversion of the air flow being provided in between. This improves the heat transfer.

Figure 5:
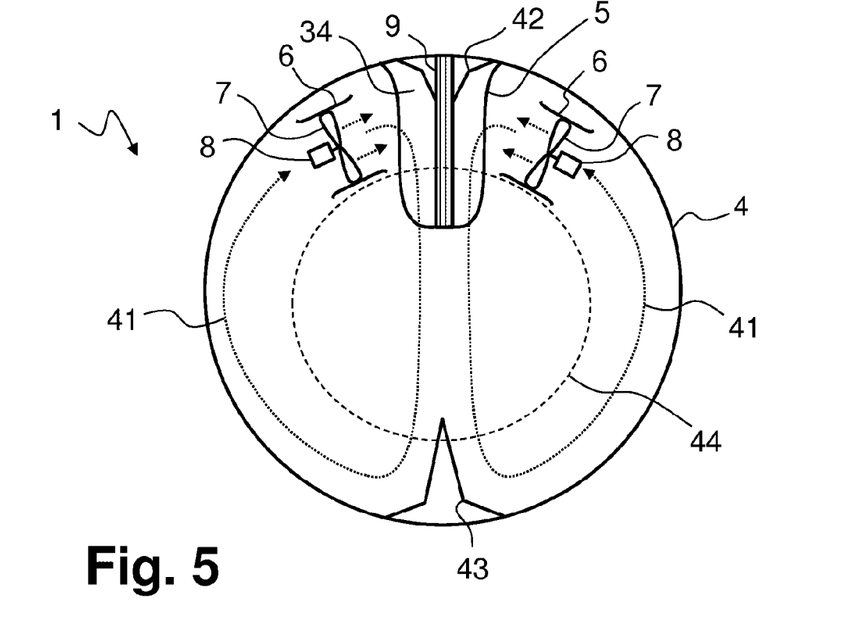
FIG. 5 is a cross-sectional view of another embodiment of a housing for a container.

FIG. 5 shows a horizontal section through a further embodiment of a housing 4 for a container 1. In this embodiment, it is likewise the case that two flow paths 41 are provided in the housing 4. The flow paths are guided through the housing 4 by using a first diverting device 42 and a second diverting device 43, correspondingly to the flow paths illustrated in FIG. 4. In order to save space in the interior 44 of the housing 4, it is the case in FIG. 5 that two apparatuses 6 are provided which each include a blower 7 and a blower motor 8 and which are disposed in the sections of the flow paths 41 at the wall of the housing 4. The heating device 5 is in the form of an impingement element, with the apparatuses 6 forcing the air flow toward the heating device 5. The heating device 5 has an electrically operable heating element 9 and heating fins 34 which distribute the heat produced by the electrically operable heating element 9. At least the first diverting device 42 or the second diverting device 43 may be formed as a structural unit together with the heating device 5.

Figure 6:
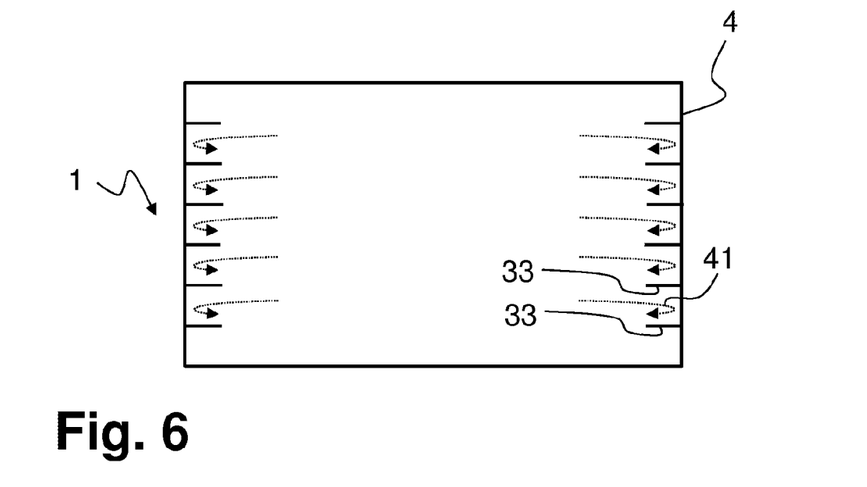
FIG. 6 is a cross-sectional view of a further embodiment of a housing for a container.

FIG. 6 shows a vertical diagrammatic section through a housing 4 for a container 1. The housing 4 has (for example substantially horizontal and/or helically running) fins 33 on its inner side which delimit the flow paths 41 that run through the housing 4 along the wall of the housing 4. The fins 33 direct the flow paths 41 along the wall of the housing 4. Furthermore, the fins 33 ensure an improved transfer of heat between the air circulating along the flow paths 41 and the housing 4.

Figure 7:
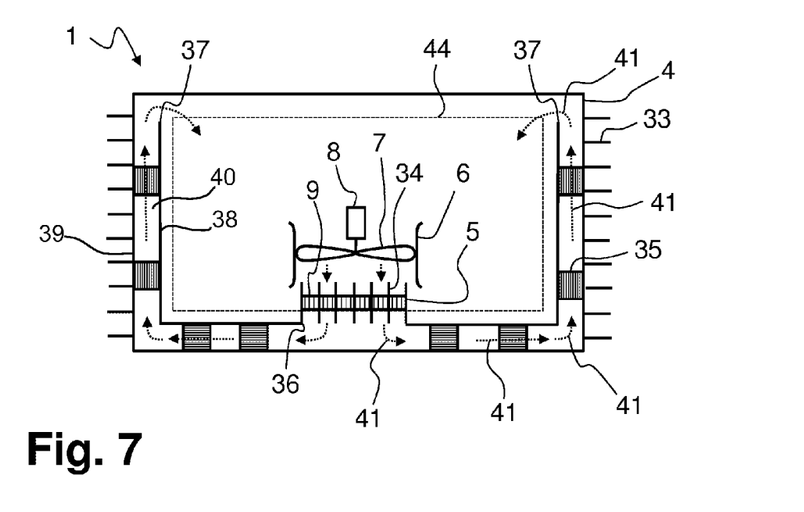
FIG. 7 is a cross-sectional view of an additional embodiment of a housing for a container.

FIG. 7 shows a horizontal section through another embodiment of a housing 4 for a container 1. In this embodiment, the housing 4 is composed of an inner wall 38 and an outer wall 39. The outer wall 39 closes off the housing 4 in fluid-tight fashion and is in contact, by way of its outer side, with the liquid additive (such as urea-water solution) when the housing 4 is inserted into a tank. The inner wall 38 and the outer wall 39 are spaced apart from one another in such a way that there is an intermediate space 40 between the inner wall 38 and the outer wall 39. Spacer elements or spacers 35 may be provided which position the inner wall 38 and the outer wall 39 relative to one another and which may also serve for forming flow paths. The inner wall 38 may be partially interrupted in such a way that there are connections, through which a flow can pass, from the intermediate space 40 into the interior 44 of the housing 4. An apparatus 6 with a blower 7 and a blower motor 8 is disposed in the housing 4. The apparatus 6 is constructed to draw an air flow out of the interior 44 and conduct it into the intermediate space 40. For this purpose, the inner wall 38 has an inflow opening 36. The air flow is guided from the apparatus 6 through the inflow opening 36 and the intermediate space 40, and exits the intermediate space 40 again at least at one outflow opening 37 in the inner wall 38. The air flow then passes through the interior 44 to the apparatus 6 again. A flow path 41 through the housing is thus formed. The air flow passes along a heating device 5 between the apparatus 6 and the inflow opening 36 on the flow path 41. The heating device 5 may include an electrically operable heating element 9 and heating fins 34 through the use of which the heat produced by the electrically operable heating element 9 is transmitted in an effective manner to the air flow. On the outer side of the housing 4 there are provided fins 33 through which the heat of the airflow can be transmitted to the liquid additive in a tank.

The embodiments illustrated herein show preferred combinations of technical features which, however, need not imperatively be combined with one another in this way. Unless explicitly specified above, the technical features may be extracted from one figure and combined, in a manner that does not pose problems to a person skilled in the art, with other concepts/structural variants. This relates, in particular, to the construction/configuration/number of apparatuses, flow paths, housings and heat transport measures (fins, etc.).

The invention thus achieves the object mentioned in the introduction, specifically that of at least partially solving the problems highlighted with regard to the prior art. In particular, a container for a tank for storing a liquid additive such as urea-water solution has been specified, which container permits inexpensive, simple and efficient heating. Furthermore, a particularly advantageous and space-saving integration of a heating system into a motor vehicle has been presented.

The invention claimed is:

1. A tank for storing a liquid additive comprising:
   a container disposed within the tank, the container including a housing having a wall defining an interior, said housing having a feed line for extracting the liquid additive from the tank into said housing, said feed line passing through said housing wall from an exterior of said housing into said interior of said housing;
   a heater associated with said housing; and
   at least one drivable apparatus disposed within said housing and configured to promote convection in said housing.

2. The tank according to claim 1, wherein said at least one drivable apparatus includes a blower and a blower motor connected to said blower.

3. The tank according to claim 1, wherein said heater is disposed in said housing and has a single, electrically operable heating element.

4. The tank according to claim 1, wherein said heater has a periphery and projects at least partially with said periphery fully exposed into said housing.

5. The tank according to claim 1, which further comprises a multiplicity of functional components disposed in the container for delivering the liquid additive out of the tank and through the container.

6. The tank according to claim 1, wherein said housing is composed at least partially of plastic.

7. The tank according to claim 1, which further comprises at least one internal fin disposed in said housing.

8. The tank according to claim 1, wherein said housing has an inner wall and an outer wall forming an intermediate space therebetween and defining at least one partially closed flow path in said intermediate space for a convection flow.

9. The tank according to claim 1, wherein said housing has a circular cross section.

10. The tank according to claim 1, wherein said housing is a cylinder.

11. A tank for storing a liquid additive, the tank comprising:
    a tank wall defining an interior for storing the liquid additive;
    a container having a housing, said container disposed in said interior;
    a heater disposed within said housing;
    at least one drivable apparatus disposed within said housing and configured to promote convection in said housing; and
    a PUMP disposed within said housing and configured to extract the liquid additive stored within said interior.

12. A motor vehicle, comprising:
    a tank for storing a liquid additive, said tank having a tank wall forming a tank volume;
    an exhaust system with a metering device for the liquid additive;
    a container having:
       a housing;
       a heater associated with said housing; and
       at least one drivable apparatus configured to promote convection in said housing;
    said container being inserted into said tank wall; and
    a plurality of functional components disposed in said container for delivering the liquid additive out of said tank through said container to said metering device.

* * * * *